United States Patent [19]
Asari et al.

[11] Patent Number: 5,211,272
[45] Date of Patent: May 18, 1993

[54] SUPPORTING STRUCTURE FOR CONTROL ELEMENTS FOR AUTOMATIC TRANSMISSION

[75] Inventors: Masahiro Asari; Shigeto Umebayashi, both of Shizuoka; Kazuyoshi Iwanaga; Noboru Hattori, both of Kanagawa, all of Japan

[73] Assignees: Jatco Corporation; Nissan Motor Company, Limited, both of Japan

[21] Appl. No.: 870,230

[22] Filed: Apr. 20, 1992

Related U.S. Application Data
[63] Continuation of Ser. No. 454,382, Dec. 21, 1989, abandoned.

[30] Foreign Application Priority Data
Dec. 26, 1988 [JP] Japan ................................ 63-330495

[51] Int. Cl.$^5$ .............................................. F16D 67/02
[52] U.S. Cl. .................... 192/12 B; 192/12 C; 192/18 A; 192/85 AA
[58] Field of Search ........... 192/12 B, 115, 12 R, 192/12 C, 18 A, 85 AA; 475/107, 146, 148, 312, 318, 324

[56] References Cited
U.S. PATENT DOCUMENTS

| | | | |
|---|---|---|---|
| 2,683,997 | 7/1954 | Forster | 475/312 |
| 4,036,082 | 7/1977 | Onuma | 475/148 X |
| 4,050,329 | 9/1977 | Zaiser et al. | 475/148 |
| 4,331,044 | 5/1982 | Bookert et al. | 475/148 X R |
| 4,455,890 | 6/1984 | Kuramochi et al. | 475/312 X |
| 4,650,046 | 3/1987 | Parsons | 192/4 A X |

Primary Examiner—Richard M. Lorence
Attorney, Agent, or Firm—Ronald P. Kananen

[57] ABSTRACT

A supporting structure for control elements of an automatic transmission including a multiple-disc clutch having a piston operated by hydraulic pressure from a control valve unit and a cylinder slidably supporting the piston, and a one-way clutch having outer and inner races and a series of sprags placed between both of the races so as to mechanically jam depending on the rotational direction of the outer race, comprises a support member comprised of the cylinder and the inner race which are integrally formed with each other, and a transmission case for fixing the support member on the inner surface thereof from the inside of the transmission case by means of bolts.

6 Claims, 4 Drawing Sheets

FIG. 3

| | REV/C | H/C | FWD/C | OVR/C | L&R/B | LOW O.W.B | FWD O.W.C | B/B | D/C | RDCN/B | RDCN O.W.B | S/A | S/R | OD S/A |
|---|---|---|---|---|---|---|---|---|---|---|---|---|---|---|
| 1ST | | | ○ | ⊗ | ○ | ▨ | ▨ | | | ○ | ▨ | | | |
| 2ND | | | ○ | ○ | | | ▨ | ○ | | ○ | ▨ | ○ | | |
| 3RD | | ○ | ○ | ○ | | | ▨ | | | ○ | ▨ | ⊗ | ○ | |
| 4TH | | ○ | ○ | ○ | | | ▨ | | ○ | | | ⊗ | ○ | |
| 5TH | | ○ | ⊗ | | | | | ○ | ○ | | | ⊗ | ⊗ | ○ |
| REV | ○ | | | | ○ | | | | | ○ | | | | |

SUPPORTING STRUCTURE FOR CONTROL ELEMENTS FOR AUTOMATIC TRANSMISSION

This application is a continuation of application Ser. No. 07/454,382 filed Dec. 21, 1989 now abandoned.

BACKGROUND OF THE INVENTION

1. Field of the Invention

The present invention relates to a supporting structure for control elements assembled in an automatic transmission for setting a gear ratio between input and output shafts according to a manually entered command and vehicle condition. Specifically to a supporting structure for elements, such as a piston for a low and reverse brake and a series of sprags for a low one-way clutch and/or a piston for a reduction brake and a series of sprags for a one-way reduction clutch.

2. Description of the Prior Art

A conventional supporting structure for control elements for an automatic transmission has been disclosed in "NISSAN SERVICE WEEKLY BULLETIN Vol. 578, Page C-13" published on June, 1987 by Nissan Motor Co., Ltd.

As shown in FIG. 1, such a conventional supporting structure is comprised of a cylinder 2a provided for slidably supporting a piston 1 of a low and reverse brake 8 and an annular inner race 4 provided for supporting a series of sprags 3 of a low one-way clutch 9. The low and reverse brake 8, composed of a multiple-disc clutch and the low one-way clutch 9 including sprags 3, both serving as control elements for the automatic transmission, are disposed within a transmission case 2 in the vicinity of a rear extension housing 5.

As clearly seen in FIG. 1, the cylinder 2a is integrally formed with the transmission case 2, while the inner race 4 is separately formed from the cylinder 2. The cylinder 2a and the inner race 4 are assembled by means of bolts 6. In this conventional supporting structure, the rear extension housing 5 must be detachable so as to provide working space for a tool required for fastening/unfastening the bolts 6. For this reason, the extension housing 5 is detachably connected to the rear end of the transmission case 2 by means of bolts 7.

However, in the previously described conventional supporting structure, since the cylinder 2a of the low and reverse brake 8 and the inner race 4 of the low one-way clutch 9 are formed apart from each other, such a conventional supporting structure has various problems.

For instance, in order to support the control elements, the supporting structure is comprised of three components, namely the transmission case 2 having the cylinder 2a, the inner race 4, and the rear extension housing 5. Therefore, this prior art supporting structure requires bolt connections between the cylinder 2a and the inner race 4 and between the transmission housing 2 and the extension housing 5. Furthermore, the above mentioned supporting structure requires suitable sealing at the mating surfaces between the cylinder 2a and the inner race 4 and between the transmission case 2 and the extension housing 5 to prevent working fluid in the automatic transmission from leaking through the mating surfaces. This conventional supporting structure is complicated and the manufacturing cost of the whole automatic transmission is high therefore.

SUMMARY OF THE INVENTION

It is, therefore, in view of the above disadvantages, an object of the present invention to provide a simple supporting structure for control elements of an automatic transmission in which the the number of bolts used for assembling the parts can be the number of bolts used for assembling the parts can be decreased.

It is another object of the invention to provide an automatic transmission including an economical supporting structure for control elements of the transmission which can assuredly prevent working fluid in the transmission from leaking outside of the transmission case.

In order to accomplish the aforementioned and other objects, a supporting structure for control elements of an automatic transmission including a frictional element having a piston operated by hydraulic pressure and a cylinder supporting the piston, and a one-way brake having outer and inner races and an engaging member placed between the outer and inner races so as to mechanically engage depending on the rotational direction of the outer race, comprises a support member including the cylinder and the inner race which are integrally formed with each other, and a transmission case for fixing the support member to the inner surface thereof from the inside of the transmission case.

According to another aspect of the invention, an automatic transmission comprises a frictional element having a piston operated by hydraulic pressure and a cylinder supporting the piston, a one-way brake having outer and inner races and an engaging member placed between the outer and inner races so as to mechanically engage depending on the rotational direction of the outer race, a support member including the cylinder and the inner race which are integrally formed with each other, and a transmission case for fixing the support member to the inner surface thereof from the inside of the transmission case. The engaging member may include a series of sprags. In an automatic transmission with a sub-transmission, the frictional element may include a reduction brake as well as a low and reverse brake, such as a multiple-disc clutch and the one-way clutch may include a one-way reduction clutch as well as a low one-way brake. The cylinder and the inner race are integrally formed by casting, to provide a single support member for supporting both the piston and the sprags.

BRIEF DESCRIPTION OF THE DRAWINGS

FIG. 3 is a chart showing active components of the transmission of FIG. 2, which are active in respective operational ranges.

DESCRIPTION OF THE PREFERRED EMBODIMENT

Figure 1:
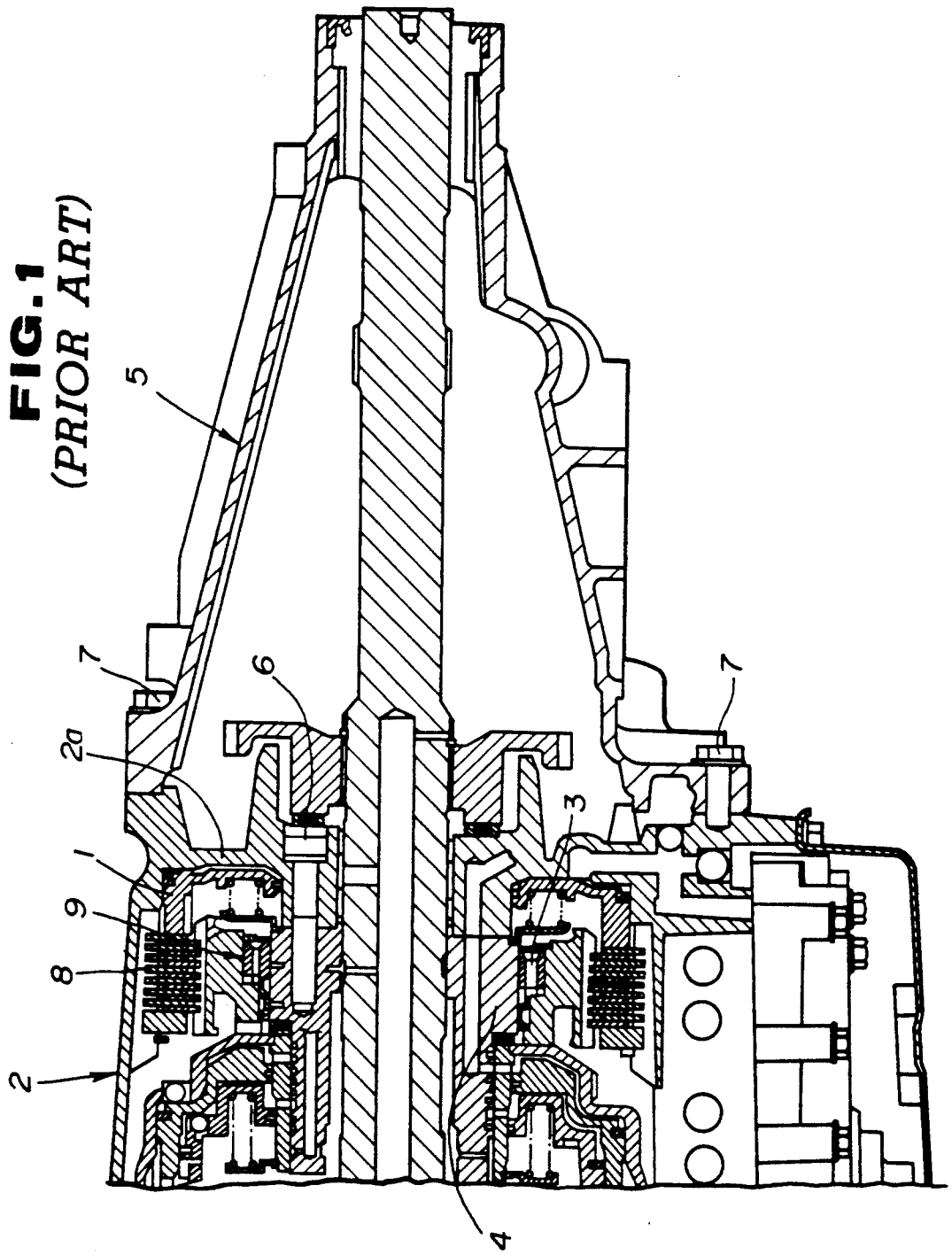
FIG. 1 is a cross sectional view illustrating a conventional supporting structure for control elements of an automatic transmission.
Figure 2:
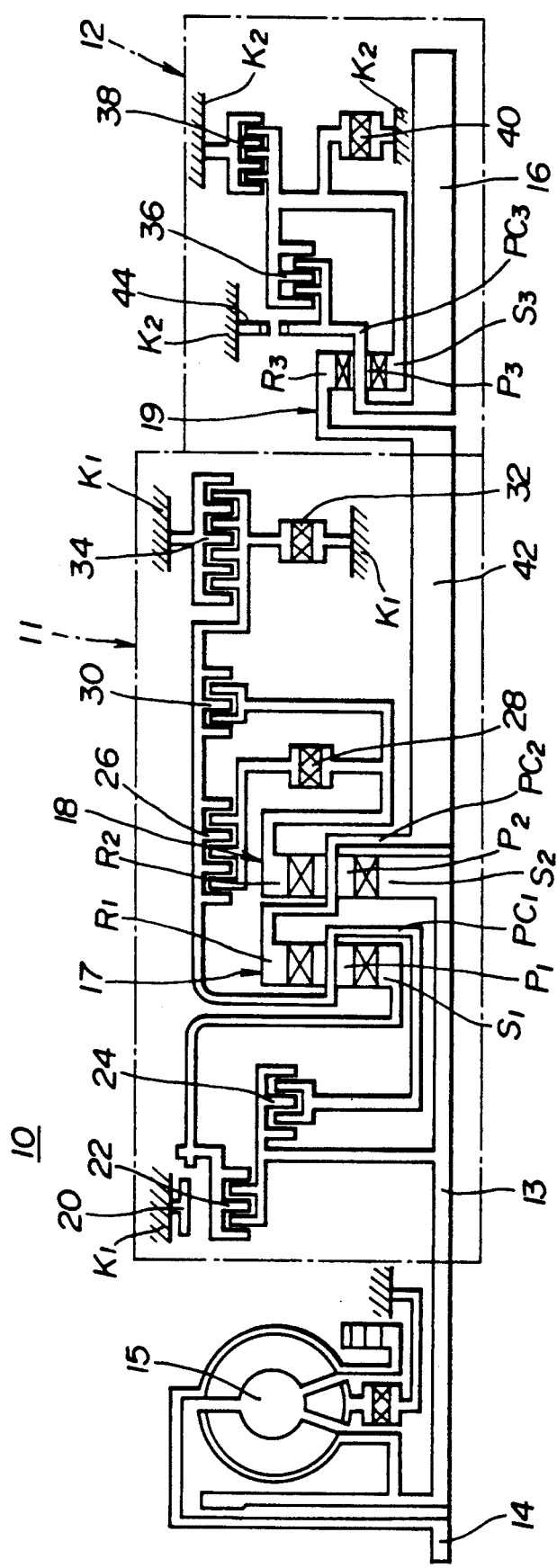
FIG. 2 is a skeleton view illustrating an upper half of an automatic transmission employing a sub-transmission, utilizing a supporting structure of the embodiment according to the invention.

Referring now to the drawings, particularly to FIG. 2, there is shown an automatic transmission 10 having a power train of five forward speed ratios and one reverse speed ratio. The transmission 10 includes a main transmission 11 having a power train of four forward speed ratios, combined with a sub-transmission 12 having an additional planetary gearset. The transmission 10 includes an input or turbine shaft 13 connected to a crank or output shaft 14 of an internal combustion engine via a torque converter 15. The transmission 10 also includes an output shaft 16 for transmitting driving torque to a drive shaft. The torque converter 15 is comprised of a pump impeller, a turbine runner and a stator. The pump impeller is connected to the engine output shaft 14, while the turbine runner is connected to the input shaft 13. The pump impeller is also connected to an oil pump. Between the input shaft 13 and the output shaft 14, provided are a first planetary gearset 17, a second planetary gearset 18, and a third planetary gearset 19, each acting as a simple planetary-gear system. The first planetary gearset 17 includes a sun gear $S_1$, pinions $P_1$, a ring gear $R_1$ and a planet-pinion carrier $PC_1$ supporting the pinions $P_1$, while the second planetary gearset 18 includes a sun gear $S_2$, pinions $P_2$, a ring gear $R_2$ and a planet-pinion carrier $PC_2$ supporting the pinions $P_2$. On the other hand, the third planetary gearset 19 includes a sun gear $S_3$, pinions $P_3$, a ring gear $R_3$ and a planet-pinion carrier $PC_3$ supporting the pinions $P_3$.

The transmission 10 also includes a brake band (B/B) 20, a reverse clutch (REV/C) 22, a high clutch (H/C) 24, a forward clutch (FWD/C) 26, a forward one-way clutch (FWD O.W.C) 28, an overrun clutch (OVR/C) 30, a low one-way brake (LOW O.W.B) 32, a low and reverse brake (L&R/B) 34, a direct clutch (D/C) 36, a reduction brake (RDCN/B) 38 and a one-way reduction brake (RDCN O.W.B) 40, serving as control elements for controlling the planetary-gear systems 17, 18, and 19. Reference numeral 42 denotes an intermediate shaft provided for transmitting the driving torque from the input shaft 13 to the output shaft.

The sun gear $S_1$ is so designed as to be connectively associated with the input shaft 13 via the reverse clutch 22. The pinion carrier $PC_1$ is so designed as to be connectively associated with the input shaft 13 via the high clutch 24. The carrier $PC_1$ is also connected to the ring gear $R_2$ of the second planetary gearset 18 via the forward clutch 26 and the forward one-way clutch 28 which is coupled with the forward clutch in series. The carrier $PC_1$ can also be connected to the ring gear $R_2$ via the overrun clutch 30 which is provided in parallel with the forward one-way clutch 28. The low and reverse brake 34 permits the carrier $PC_1$ to anchor to a transmission case $K_1$ of the main transmission 11. The brake band 20 can fix the sun gear $S_1$ to the transmission case $K_1$. The low one-way brake 32 permits the pinion carrier $PC_1$ to rotate in one direction but not in the other. The sun gear $S_2$ of the second planetary gearset 18 is constantly connected to the input shaft 13. On the other hand, the ring gear $R_1$ of the first planetary gearset 17 and the pinion carrier $PC_2$ of the secondary planetary gearset 18 are integrally connected to each other. The carrier $PC_2$ is constantly connected to the intermediate shaft 42 which is constantly connected to the ring gear $R_3$ of the third planetary gearset 19 in the sub-transmission 12. The pinion carrier $PC_3$ of the third planetary gearset 19 is constantly connected to the output shaft 16. The carrier $PC_3$ is also connected to the sun gear $S_3$ via the direct clutch 36. The reduction brake 38 permits the sun gear $S_3$ to anchor to a sub-transmission case $K_2$ of the sub-transmission 12. The one-way reduction brake 40 permits the sun gear $S_3$ to rotate in one direction but not in the other. Reference numeral 44 denotes a parking pawl connected to the carrier $PC_3$ so as to lock the output shaft 16 to the sub-transmission case $K_2$ when the transmission is in park.

The aforementioned control elements are selectively operated by hydraulic pressure from a control valve unit (not shown) which is traditionally provided in the bottom of the transmission case. The transmission modes are selectable by combination of the states of a plurality of control elements, namely the brake band (B/B) 20, the reverse clutch (REV/C) 22, the high clutch (H/C) 24, the forward clutch (FWD/C) 26, the forward one-way brake (FWD O.W.C) 28, the overrun clutch (OVR/C) 30, the low one-way brake (LOW O.W.B) 32, the low and reverse brake (L&R/B) 34, the direct brake (D/C) 36, the reduction brake (RDCN/B) 38 and the one-way reduction clutch (RDCN O.W.C) 40, establishing various operational modes of the components ($S_1$, $S_2$, $S_3$, $R_1$, $R_2$, $R_3$, $PC_1$, $PC_2$, $PC_3$) of the three planetary gearsets 17, 18 and 19.

As shown in FIG. 3, each of the respective control elements can be selectively engaged or released so as to adjust the gear ratio between the input shaft 13 and the output shaft 16. In FIG. 3, ○ denotes engagement of the respective control elements. Unmarked sections correspond to a released state of the control elements. ⊙ denotes elements which affect engine braking and which can be brought into engagement only while the accelerator opening angle is 1/16 or less. ● denotes elements which can be brought into engagement only during acceleration. Ⓧ denotes engagement of elements which do not affect power flow. Ⓧ denotes elements which can be brought into engagement only while the accelerator opening angle is 1/16 or less and which do not affect engine braking. As seen in the chart of FIG. 3, the brake band (B/B) 20 is in practice engaged or released through a hydraulic band servo comprising a second speed servo apply chamber (S/A), a servo release chamber (S/R) and a fifth speed servo apply chamber (OD S/A). For instance, when pressure is supplied to the second speed servo apply chamber (S/A), the brake band is applied. Under this condition, if pressure is supplied to the servo release chamber (S/R), the brake band is released. Subsequently, when pressure is supplied to the fifth speed servo apply chamber (OD S/A), the brake band is engaged again.

Figure 4:
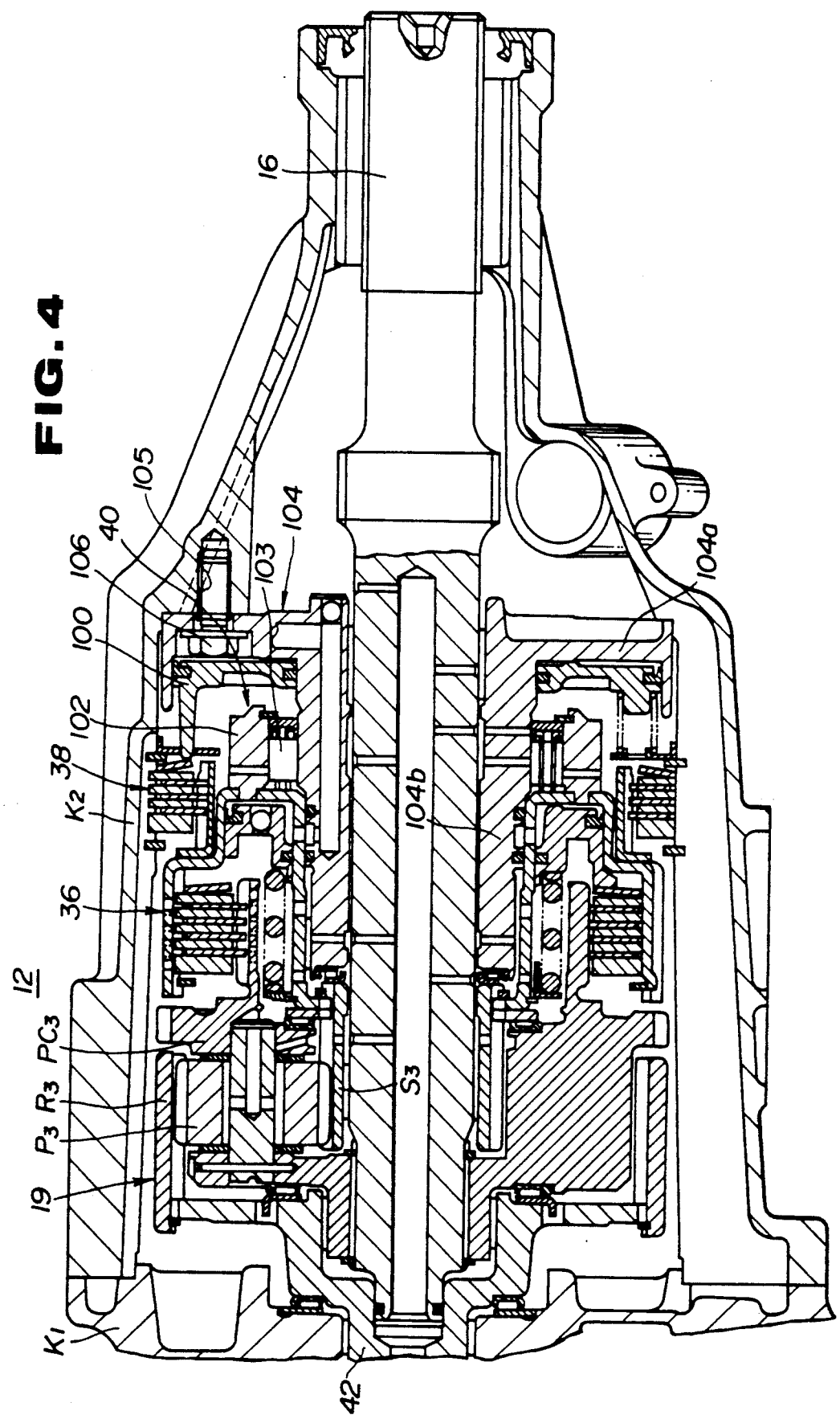
FIG. 4 is a cross sectional view illustrating the supporting structure of the embodiment according to the invention.

Referring now to FIG. 4, there is shown the sub-transmission 12 utilizing a supporting structure for control elements according to the invention. The sub-transmission 12 employs the reduction brake (RDCN/B) 38 and the sprag-type one-way reduction clutch (RDCN O.W.B) 40. As clearly seen in FIG. 4, the reduction brake 38 is constructed by a multiple-disc clutch and includes a piston 100 which is slidably supported by a cylinder 104a and can be operated by hydraulic pressure from the control valve unit (not shown). The one-way reduction brake 40 is comprised of an outer race 102 assembled to the sun gear $S_3$, an inner race 104b fixed to the sub-transmission case $K_2$ of the sub-transmission 12, and a series of sprags 103 placed between the outer and inner races 102 and 104b. Particularly, the inner race 104b serves as a center support for the sprags 103. Assuming that the sprags permit rotation of the outer race 102 in one direction, the sprags prevents the outer race 102 from rotating in the opposite direction, because the inner race 104b is held stationary and the sprags jam between the outer and inner races.

As clearly seen in FIG. 4, in the supporting structure according to the invention, the cylinder 104a of the reduction brake 38 and the inner race 104b of the one-way reduction brake 40 are integrally formed as a unit, i.e. a support member 104, not including a mating surface between the cylinder 104a and the inner race 104b. The support member 104 is fixed on the sub-transmission case $K_2$ by means of bolts 106 screwed into the associated internal threaded portions 105 of the case $K_2$ without removing the rear extension section.

In manufacturing the sub-transmission 12, since the cylinder 104a and the inner race 104b are integrally formed as the support member 104 and further the sub-transmission case is integrally formed with the rear extension section, the number of the components of the sub-transmission can be decreased.

In assembling the sub-transmission 12, the integrally formed support member 104 is fixed to the non-split sub-transmission case $K_2$ from the inside thereof by the bolts 106, thereby reducing the number of bolts used for assembly of the sub-transmission 12.

As will be appreciated from the above, there is a considerable decrease in the number of assembling bolts and components required for the transmission, consequently the number of mating surfaces of associated components is decreased to minimum. The non-split sub-transmission case $K_2$ of the embodiment is not susceptible to leakage of oil outside of the case as no mating surfaces exist between the case and the rear extension.

Although in the preferred embodiment according to the invention, a supporting structure for a piston of a reduction brake and a series of sprags of a one-way reduction clutch, both employed in a sub-transmission has been described, the supporting structure may be applied for supporting a piston of a low and reverse brake and a series of sprags of a low one-way clutch, both employed in a main transmission or may be applied for an automatic transmission without a sub-transmission.

While the foregoing is a description of the preferred embodiment for carrying out the invention, it will be understood that the invention is not limited to the particular embodiments shown and described herein, but may include variations and modifications without departing from the scope or spirit of this invention as described by the following claims.

What is claimed is:

1. A supporting structure for control elements for an automatic transmission at least including a first frictional element being actuated by a piston operated by hydraulic pressure and a cylinder supporting said piston, a one-way brake having outer and inner races and an engaging member placed between said outer and inner races so as to mechanically engage depending on the rotational direction of said outer race, and a second frictional element having a clutch drum operatingly enclosing therein a plurality of clutch plates, comprising:

a support member being comprised of a cylindrical portion axially extending along a transmission shaft and a flange portion radially extending from one axial end of said cylindrical portion and defining said cylinder therein, said cylindrical portion and said flange portion integrally formed with each other as one piece;

said cylindrical portion being integrally formed with said inner race as one-piece, and arranged for supporting on an outer periphery thereof said clutch drum of said second frictional element as well as said one-way brake;

a transmission case associated with said support member, for securing said flange portion of said support member by fastening means onto an inner wall thereof from the interior of said transmission case; and said clutch drum being integrally formed with said outer race of said one-way brake, and associated with said transmission case through said first frictional element, such that said clutch drum is engaged with said transmission case when said first frictional element is activated, while said clutch drum is disengaged from said transmission case when said first frictional element is deactivated.

2. The supporting structure as set forth in claim 1, wherein said engaging member includes a series of sprags.

3. The supporting structure as set forth in claim 2, wherein said first frictional element includes a reduction brake and said one-way brake includes a one-way reduction brake.

4. The supporting structure as set forth in claim 2, wherein said first frictional element includes a low and reverse brake and said one-way brake includes a low one-way brake.

5. The supporting structure as set forth in claim 1, wherein said support member is made of cast material.

6. The supporting structure as set forth in claim 1, wherein said fastening means is comprised of bolts.

* * * * *